United States Patent [19]

Nagae

[11] Patent Number: 4,716,521
[45] Date of Patent: Dec. 29, 1987

[54] MICROCOMPUTER

[75] Inventor: Yasutaka Nagae, Kawasaki, Japan

[73] Assignee: Fujitsu Limited, Kawasaki, Japan

[21] Appl. No.: 630,239

[22] Filed: Jul. 12, 1984

[30] Foreign Application Priority Data

Jul. 13, 1983 [JP] Japan .................... 58-126241

[51] Int. Cl.⁴ .............................................. G06F 1/00
[52] U.S. Cl. ......................................... 364/200; 364/900
[58] Field of Search ... 364/200 MS File, 900 MS File

[56] References Cited

U.S. PATENT DOCUMENTS

| 4,090,236 | 5/1978 | Bennett et al. | 364/200 |
| 4,276,593 | 6/1981 | Hansen | 364/119 |
| 4,458,307 | 7/1984 | McAnlis et al. | 364/200 |
| 4,509,140 | 4/1985 | Cheung | 364/900 |
| 4,590,553 | 5/1986 | Noda | 364/200 |

Primary Examiner—Gareth D. Shaw
Assistant Examiner—Christina Eakman
Attorney, Agent, or Firm—Staas & Halsey

[57] ABSTRACT

A microcomputer including a functional element for executing an internal reset instruction within the microcomputer, without a usual external reset signal. The internal reset instruction is executed every time a usual power-off instruction is executed. Thus, a power-off signal responding to the power-off instruction is maintained as it is by execution of the internal reset instruction. The microcomputer further includes a functional element for maintaining at least the level of a power-off signal until the power is completely cut off.

7 Claims, 8 Drawing Figures

MICROCOMPUTER

BACKGROUND OF THE INVENTION

1. Field of the Invention

The present invention relates to a microcomputer operated with a reset instruction, more particularly a microcomputer in which a reset operation can be properly carried out not only during the rise of a power level, but also the fall of the power level.

2. Description of the Prior Art

For a microcomputer (hereinafter "computer") to start execution of desired jobs, it generally requires a reset operation when power is first applied thereto, especially during the rise of the power. This operation "initializes" the computer.

To achieve such a reset operation, the computer usually incorporates an external reset port. An external reset circuit, such as a capacitor-resistor (CR) circuit, is connected to the pin leading to the external reset port.

A recent trend is for execution of a similar reset operation when the power is cut off, especially during the fall of the power level. Erroneous operation often occurs during the fall of the power level, especially when the level drops below the lower limit of a guaranteed operational range of the computer, for example 4.5 V (5 V−0.5 V). Specifically, the computer may jump to a totally different routine and run out of control.

The prior art has used both conventional and additional external reset circuits for the reset operation in order to cover both the rise and fall of the power level. That is, computers have been equipped with both conventional and additional external reset circuits at the appropriate pin. The external reset circuits in current use compare in size with the computer itself, however. This accordingly increases the size of the computer assembly. With very small systems, for example, an electronic camera system, there is not much room available of the electronic components.

SUMMARY OF THE INVENTION

It is an object of the present invention to provide a microcomputer in which a reset operation can be achieved during both the rise and fall of a power level without employing an additional external reset circuit.

The above object is attained by further introducing, in the computer, means for generating an internal reset instruction at a timing close to generation of a power-off instruction, either preceding or following the generation of the power-off instruction. It is preferable to employ another means, cooperating with the means for generating the reset instruction, for maintaining the power-off instruction signal and other output signals as they were prior to the reset instruction and when a conventional external reset signal is supplied to the computer.

BRIEF DESCRIPTION OF THE DRAWINGS

The present invention will be more apparent from the ensuing description with reference to the accompanying drawings, wherein like numerals refer to like parts.

DESCRIPTION OF THE PREFERRED EMBODIMENTS

The structure and operation of the computer according to the present invention can be best made clear by beginning with a general description of a usual computer. Details of the present invention will then be presented.

Figure 1:
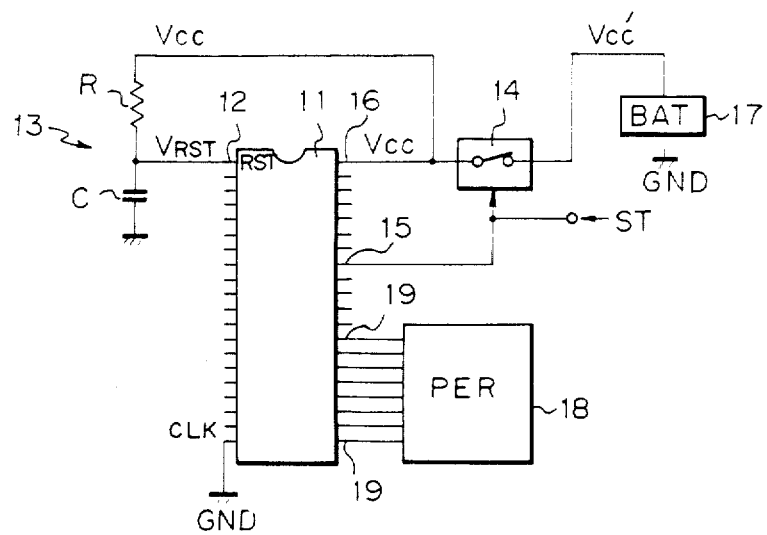
FIG. 1 is a general view of a currently used microcomputer provided with a typical external reset circuit.

FIG. 1 is a general view of a currently used microcomputer provided with a typical external reset circuit. This is, FIG. 1 depicts an external CR circuit, which is particularly effective during the rise of the power level $V_{CC}$. In FIG. 1, reference numeral 11 denotes a single-chip microcomputer unit and 12 an external reset pin (RST) to which a conventional external reset circuit, i.e., a CR circuit 13 is connected. The CR circuit 13 is energized by power at the level $V_{CC}$, which power is supplied to a power supply pin 16 via a power on/off switch 14 from a power source 17, such as a direct current (DC) battery BAT having a level $V'_{CC}$. The peak amplitudes of the level $V_{CC}$ and the level $V'_{CC}$ are quite nearly the same.

The switch 14 is illustrated schematically as a mechanical switch but, in actuality, is an electronic controlled semiconductor switch. When the computer operation is to be stopped, the switch 14 is supplied with a power-off signal from a power control pin 15. The switch 14 is self-sustained to be conductive once an external start signal ST is given thereto and until the power-off signal is generated in the computer 11.

The external start signal ST may be suitably produced. For example, in an electronic camera system, the start signal ST may be generated every time an operator touches a shutter release button. Alternatively, in a so-called multifunction telephone set, the start signal ST may be generated by an off-hook signal.

Incidentally, in the example of an electronic camera system, a peripheral circuit 18, to be used with the computer 11, functions to perform auto-focus (AF), auto-exposing (AE), auto-winding, auto-date setting, auto-flashing, and so on.

Figure 2:
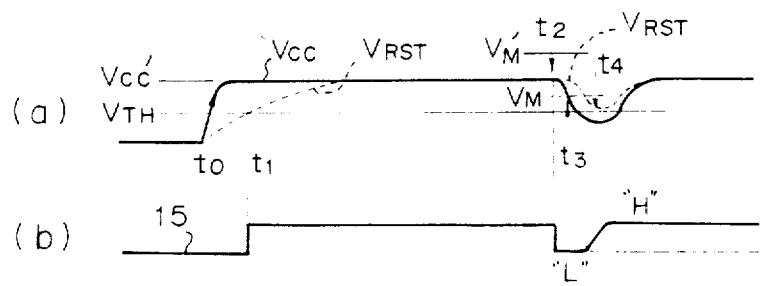
FIG. 2 depicts waveforms of signals appearing at major portions in the circuit of FIG. 1.

FIG. 2 depicts waveforms of signals appearing at major portions in the circuit of FIG. 1. The reset operation to be achieved in the computer unit 11 will be clarified with reference to FIG. 2. Row (a) exhibits the waveforms of the power level $V_{CC}$ and the reset voltage level $V_{RST}$, and row (b) exhibits the output signal from the power control pin 15. Assuming the start signal ST is given at the time t0 to start running the computer, the power ($V'_{CC}$) is supplied, via the switch 14 which is now conductive, to the power supply pin 16. The power level $V_{CC}$ at the pin 16 rises along the solid line curve soon after the time t0. At the same time, the reset voltage level $V_{RST}$ rises along the broken line curve soon after the time t0, but at a rate much slower than the rate of $V_{CC}$ due to the presence of the CR circuit 13. When the level $V_{RST}$ exceeds a predetermined threshold level $V_{TH}$, i.e., after the time t1, the reset operation in the computer 11 ceases, whereby the desired job starts being executed in accordance with a preestablished program.

Execution of the job ends with a power-off instruction. In response to an instruction for changing the logic of one of the output ports in order to achieve a power-off operation, a control signal, i.e., a power-off signal, is produced from one of the output ports, for example, the power control pin 15, to turn off the switch 14. Thus, the power is cut off and the power level $V_{CC}$ starts falling after the time t2. During the fall of the power level $V_{CC}$, i.e., at the time t3, the level $V_{CC}$ crosses the minimum voltage $V_M$ of the guaranteed operational range of the computer. The minimum voltage $V_M$ is usually set to be about 10% below the normal power source level. If the power source level is below the minimum voltage $V_M$, normal computer operation cannot be guaranteed. The maximum voltage $V'_M$ is set to be about 10% above the normal power source level. As a result, the reset operation of the computer must reach a final stage in the time t2 to time t3.

In actuality, however, the reset operation often cannot be completed between time t2 and time t3. That is, as seen from FIG. 2, the reset voltage level $V_{RST}$ falls after the fall of the power level $V_{CC}$ and reaches near the threshold level $V_{TH}$ at a time close to time t4. As indicated, the reset operation cannot commence until the level $V_{RST}$ crosses the level $V_{TH}$. Therefore, there is a likelihood that the computer will run out of control during the non-guaranteed interval, i.e., between the time t3 and time t4. At worst, the operation in the computer will jump to a routine which again specifies to turn on the switch 14. In such a case, the output signal from the power control pin 15, which should be changed from the "H" (high) level to "L" (low) level, as depicted in row (b) of FIG. 2, at the time t2 and maintained at the "L" level until the computer is restarted, thus keeping the switch 14 off, instead tends to change from "L" to "H", as shown in row (b) of FIG. 2, after the time t3 and thus makes the switch 14 conductive. This is caused by the fact that, although the level $V_{CC}$ falls below the level $V_M$ at the time t3, the reset operation is not yet completed between the time t3 and time t4. Thus, at worst, the output signal from the pin 15 changes from "L" to "H" after the time t3, as illustrated in row (b) of FIG. 2. This results in reactivation of the computer due to resupply of the power ($V'_{CC}$) via the switch 14.

In view of the above problem, the conventional reset circuit i.e., CR circuit 13, is not sufficient by itself for the computer unit 11 when an operational sequence of the overall system includes a series of alternate power-on and power-off steps performed frequently.

Figure 3:
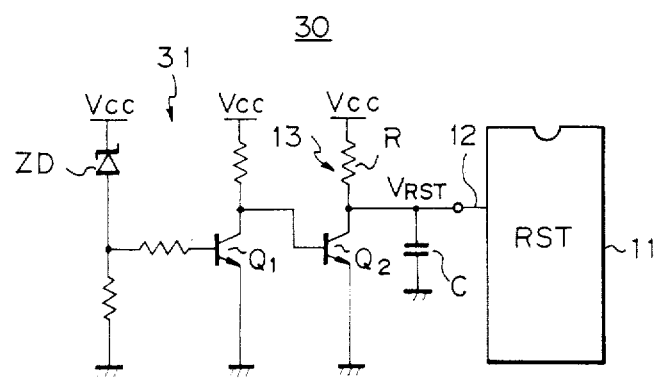
FIG. 3 is a circuit diagram of a prior art external reset circuit used with the microcomputer unit of FIG. 1.

FIG. 3 is a circuit diagram of another prior art external reset circuit used with the microcomputer unit of FIG. 1. In FIG. 3, members which are the same as those of FIG. 1 are represented by the same reference numerals and characters. The external reset circuit 30 of the prior art is constructed by the conventional CR circuit 13 and an additional reset circuit 31. The circuit 31 works to cancel the interval between the time t3 and time t4 (FIG. 2) in which the reset operation is not yet activated. As shown in FIG. 3, the additional reset circuit 31 includes transistors $Q_1$, $Q_2$, Zener diode ZD, and resistors. The Zener voltage $V_{ZD}$ is set to be substantially the same as the minimum voltage $V_M$.

A summary of the operation is as follows. During the fall of the power level $V_{CC}$, once the level $V_{CC}$ becomes lower than the Zener voltage $V_{ZD}$, the transistor $Q_2$ is turned on and, accordingly, the capacitor C is discharged. The quick discharge of the capacitor C improves the slow fall of the reset voltage $V_{RST}$ appearing at the pin 12 (FIG. 1). That is, the delay time (t3→t4) for the reset operation can be omitted. On the other hand, during the rise of the power level $V_{CC}$, while the level $V_{CC}$ is not higher than the level $V_{ZD}$, the Zener diode ZD is not conductive, the transistor $Q_1$ is off and the transistor $Q_2$ is on. After $V_{CC}$ exceeds the level $V_{ZD}$, the Zener diode ZD becomes conductive, transistor $Q_1$ turns on and transistor $Q_2$ turns off. Thereafter, in the circuit 30, the CR circuit 13 is electrically effective to gradually increase the voltage at the reset pin 12. Thus, during the rise of $V_{CC}$, the circuit 30 is almost equivalent to the external reset circuit of FIG. 1.

During the fall of the power level $V_{CC}$, when the level $V_{CC}$ becomes lower than the Zener voltage $V_{ZD}$, the transistor $Q_1$ is turned off, while the transistor $Q_2$ is turned on. Therefore, a quick discharge of the capacitor C, i.e., quick start of the reset operation, can be attained.

Figure 4:
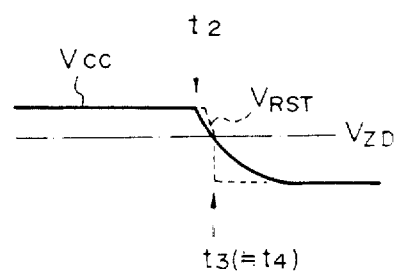
FIG. 4 depicts waveforms of signals representing $V_{CC}$ and $V_{RST}$ indicated in FIG. 3.

FIG. 4 depicts waveforms of signals representing the level $V_{CC}$ and level $V_{RST}$ shown in FIG. 3. The waveforms of FIG. 4 depict the above quick discharge of the capacitor C by the circuit 31, where the times t2, t3, and t4 correspond to those shown in FIG. 2. Thus, each reset operation during final stages of the operations in the computer can correctly be performed with the aid of the additional reset circuit 31. The circuit 31, however, has the disadvantage that since the Zener diode ZD, the transistors $Q_1$, $Q_2$, and the resistors are used in the form of discrete electric parts, the external reset circuit 30, including the CR circuit 13, is relatively large in size. It should be noted that the bipolar elements ZD, $Q_1$, and $Q_2$ cannot be formed as complementary metal-oxide semiconductory (CMOS) devices. Accordingly, it is impossible to accommodate them inside a computer unit fabricated with CMOS devices.

According to the present invention, no additional external reset circuit 31 is needed, yet the reset operation can still be performed in the computer without error. The present invention provides internal reset signal means for generating an internal reset instruction by the computer itself at a timing close to generation of the power-off instruction. The power-off instruction is an instruction for changing the logic of the power control pin 15, indicates the end of each job and is specifically expressed as the power-off signal from the power control pin 15 (FIG. 1), which works to turn off the switch 14 (FIG. 1). The internal reset instruction can be generated either just preceding or just following the generation of the power-off instruction.

Figure 5:
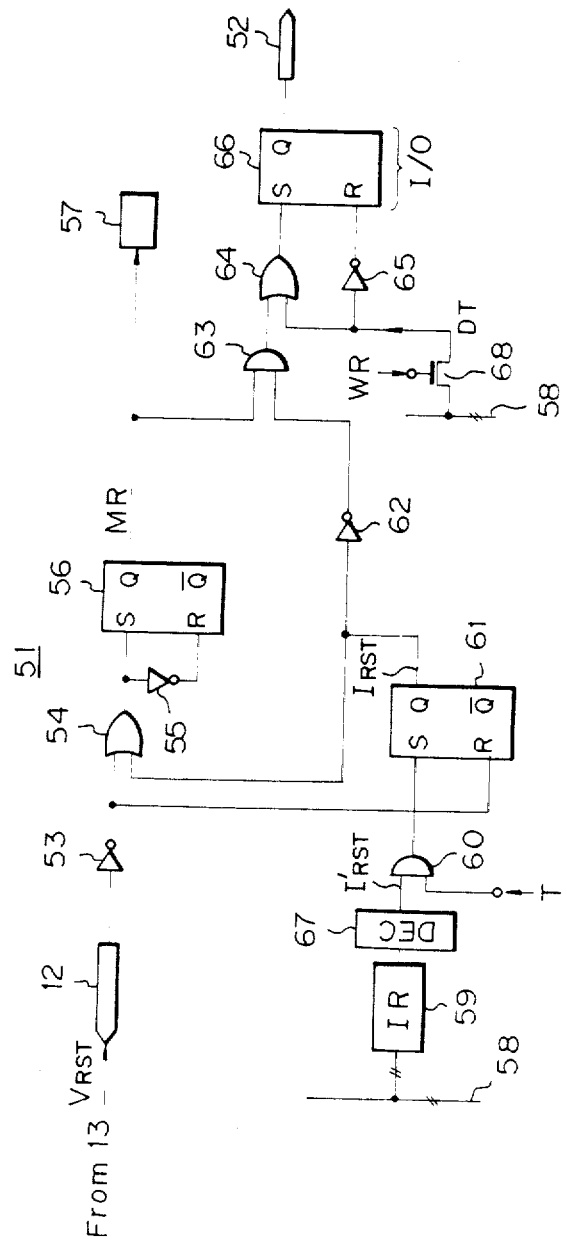
FIG. 5 is a circuit diagram representing major members according to the present invention together with part of the peripheral members already existing in a computer unit.

FIG. 5 is a circuit diagram representing major members according to the present invention together with a part of the peripheral members already existing in a computer unit. In FIG. 5, the circuit 51, other than the pins 12 and 52, is formed inside the computer unit 11 (FIG. 1). The pin 12 is the previously mentioned external reset pin. Reference numeral 52 represents the aforesaid power control pin 15 (FIG. 1) and input/output (I/O) pins 19 (FIG. 1) connected to the peripheral circuit 18 (FIG. 1). During the rise of the power level $V_{CC}$ and when the reset operation has not yet ceased, the voltage level $V_{RST}$ at the pin 12 should be the "L" level. The "L" level is changed, by way of an inverter 53, to the "H" level. The "H" level signal sets, via an OR gate 54, a master reset flip-flop 56. The output from the flip-flop 56 is used for initialization of each related computer element 57 in what is called a "master reset" (MR).

Assuming that the level $V_{RST}$ at the pin 12 is the "L" level before the charge-up of the CR circuit 13 (FIG. 1), this "L" level is changed, via the inverter 53, to the "H" level and passes through the OR gate 54. Then, the "H" level from OR gate 54 sets the flip-flop 56. Thereby, the reset operation at an initial stage (power-on sequence) begins. Thereafter, the CR circuit 13 is fully charged up and the level at the pin 12 becomes "H". Due to the "H" level, the flip-flop 56 receives, at its set input S, an "L" level signal via the inverter 53, while the flip-flop 56 receives, at its reset input R, an "H" level signal via an inverter 55. Thereby, the master reset ceases. Soon after this, the microprocessor starts being operated in accordance with a predetermined program.

According to the present invention, the internal reset instruction is further incorporated in the usual instruction set. The internal reset instruction is set up in the program to form a pair together with the usual power-off instruction, which is generated at the end of each job executed in the computer. Thus, the computer can create a reset state by itself at each final stage of the jobs executed by the computer.

The internal reset instruction is stored in advance in a program memory 77 (not shown in FIG. 5 but in FIG. 7) along with the series of usual instructions for executing the jobs. The internal reset instruction is transferred on an internal bus 58 and stored first in an instruction register (IR) 59 and then decoded by an instruction docoder 67, as with usual instructions. Thus, the instruction decoder 67 provides a corresponding internal reset instruction signal I'$_{RST}$, i.e., a control signal. The signal I'$_{RST}$, which has the "H" level, is supplied to a flip-flop 61 in synchronism with a timing signal T by means of an AND gate 60. Each instruction cycle is usually clocked by the timing signal T.

The thus synchronized internal reset instruction signal I$_{RST}$ is maintained by the flip-flop 61 and OR'ed, at the OR gate 54, with the usual external reset signal ($V_{RST}$). Accordingly, the master reset flip-flop 56 is set not only by the usual external reset signal but also the internal reset instruction signal (control signal) I'$_{RST}$. Once the flip-flop 56 is set by the signal I'$_{RST}$, the "master reset" begins in the related computer elements.

Before the receipt of the internal reset instruction signal I'$_{RST}$ from the AND gate 60, the flip-flop 61 is rendered in a reset state by the external reset signal from the pin 12 which receives the "L" level in this case. The "L" level is inverted, via the inverter 53, to the "H" level and then given to the reset terminal (R) of the flip-flop 61.

After completion of the job which started with the above reset, the internal reset instruction is generated at a timing close to the instruction indicating the end of the job, i.e., the power-off operation. In response to the thus generated internal reset instruction, the internal reset instruction signal I'$_{RST}$ is produced inside the computer. The delay time from the generation of the power-off instruction to the generation of the signal I'$_{RST}$ can be shortened to a time on the order of the instruction cycle, i.e., the frequency of the timing signal T. This means that the "master reset" is performed immediately after the cut-off of the power. This will be clarified with reference to FIG. 6.

Figure 6:
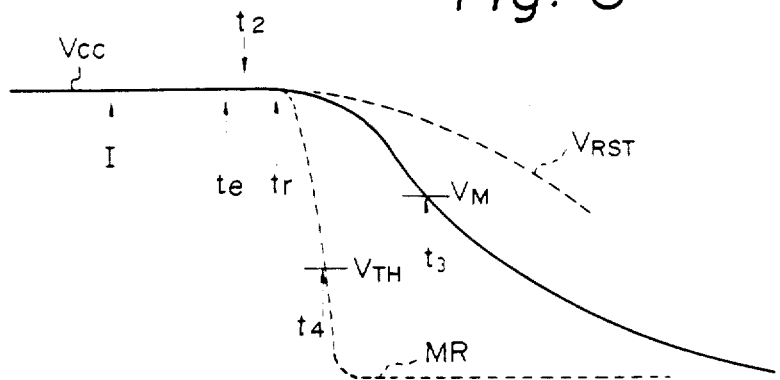
FIG. 6 depicts waveforms used for explaining reset timing according to the present invention.

FIG. 6 depicts waveforms for explaining reset timing according to the present invention. In FIG. 6, times t2, t3, and t4 correspond to those shown in FIG. 2. Reference character te denote the time when the job comes to an end, and therefore, the power-off instruction is generated. In response to the power-off instruction, the switch 14 (FIG. 1) is turned off by the output signal from the pin 15 (FIG. 1). The output signal is usually produced from the instruction decoder 67 (FIG. 5) and supplied at the pin 52 (FIG. 5), assuming that the pin 52 represents the pin 15 in this case (refer to FIG. 7). In FIG. 5, the signal line for transferring the output signal (67→52) is not illustrated.

According to the present invention, the internal reset instruction signal I$_{RST}$, is generated close to the time te (FIG. 6). Therefore, the corresponding reset operation starts being preformed soon after the time te at the time tr. Thus, the master reset is performed. The time tr follows the time te by a time approximately equal to the instruction cycle, which is usually about 2 μs. This 2 μs delay time is much shorter than the time constant defined by the falling curve $V_{RST}$ of FIG. 6, which is usually on the order of several milliseconds.

The time tr can be caused to occur immediately after the time te by locating the internal reset instruction close to the power-off instruction. The internal reset instruction can be positioned either before or after the power-off instruction. The former case will be explained hereinafter.

Referring still to FIG. 5, a master reset may be classified into two major modes. In the first mode, the computer is rendered into the master reset state when the reset voltage level $V_{RST}$ is at the "L" level (corresponding to the period of time between t0 and t1 of FIG. 2). In the second mode, the computer is not rendered in the master reset state, when the voltage level $V_{RST}$ is at the "H" level, however, once the internal reset instruction is generated, the computer enters the master reset state regardless of the "H" level $V_{RST}$ (corresponding to the period of time between t2 and t3 of FIG. 6).

The first mode is a usual mode performed in a microcomputer. In this mode, the I/O pins, represented by the pin 52 of FIG. 5, are fixed at the "L" level, which mode is considered as initialization of the computer. Under the initialization mode, the flip-flop 56 produces an "H" level output for master reset of the related computer elements 57 (FIG. 5). In the first mode, however, the flip-flop 61 does not produce an internal reset instruction signal T$_{RST}$, but an "L" level output. This "L" level output is inverted by an inverter 62 to an "H" level signal and then transferred, via an AND gate 63, opened by the "H" level output of the flip-flop 56, and an OR gate 64, to a flip-flop 66 at its set terminal (S). The flip-flop 66 is thereby set to produce the "H" level output continually. As a result, the pin 52 is sustained at the "H" level. If the pin 52 is the power control pin 15 (refer to FIG. 7), the thus sustained "H" level output keeps the switch 14 (FIG. 1) conductive.

Under the second mode, the resultant data of the finished job is held as it is. The resultant data is supplied, from a random access memory (RAM) in the computer and via the internal bus 58, to the OR gate 64 as a data DT, when a transfer gate 68 (FIG. 5) is opened by a write signal WR (FIG. 5) output from a related computer element among the elements 57 (FIG. 5). Then, if data DT is the "H" level, the flip-flop 66 is set by the data DT from the OR gate 64. Conversely, if data DT is the "L" level, the flip-flop 66 is reset by the data DT by means of an inverter 65. The inverter 65 inverts the "L" level to the "H" level and then supplies the inverter "H" level signal to the reset terminal (R) of the flip-flop 66. The resultant data DT, including the power-off signal ("L"), is accordingly maintained as it is at the pin 52, because the write signal WR is inhibited by the internal reset instruction. Thus, the transfer gate 68 is closed.

In this case, it is important to note that the power-off signal from the pin 52 (15) must be maintained as it is at the "L" level after the internal reset instruction signal $I_{RST}$ is applied to the flip-flop 66, to which $I_{RST}$ travels through the OR gate 54, the flip-flop 56, the AND gate 63, and the OR gate 64. If the AND gate 63, the OR gate 64, and the flip-flop 66 were not used, the power-off signal at the pin 52 (15) would probably be erroneously changed to the "H" level again (refer to the period of time between time t3 and time t4) by the following external reset signal ($V_{RST}$) from the pin 12, which signal ($V_{RST}$) is given at the time t4 of FIG. 6. Such an erroneous change to "H" may be caused since the computer is not guaranteed to operate normally during the related time (t3→t4). That is, once the signal $I'_{RST}$ of "H" is generated from the decoder 67 at the time tr (FIG. 6), the AND gate 63 is immediately closed by the signal $I_{RST}$, which is inverted in level to "L" by the inverter 62, so that the following external reset signal ($V_{RST}$) cannot pass therethrough. On the other hand, the power-off signal of the "L" level is maintained as it is with the aid of the flip-flop 66 regardless of the generation of the external reset signal and the lowered power level $V_{CC}$. The declining power level $V_{CC}$ will in any case reach zero, and the flip-flop 66 and other members will in any case be deenergized. In this case, the flip-flop 66 is gradually deenergized while keeping the "L" level output as it is. Therefore, the power-off signal cannot erroneously be changed to the "H" level.

Generally speaking, according to the present invention, it is preferable to employ a signal maintaining means, cooperating with the previously mentioned internal reset signal means which generates the internal reset instruction signal $I_{RST}$, for maintaining the power-off signal and other output signals as they are, even though the external reset signal is supplied to the computer. The flip-flop 66 provides the above-mentioned signal maintaining means in the above embodiment.

Figure 7:
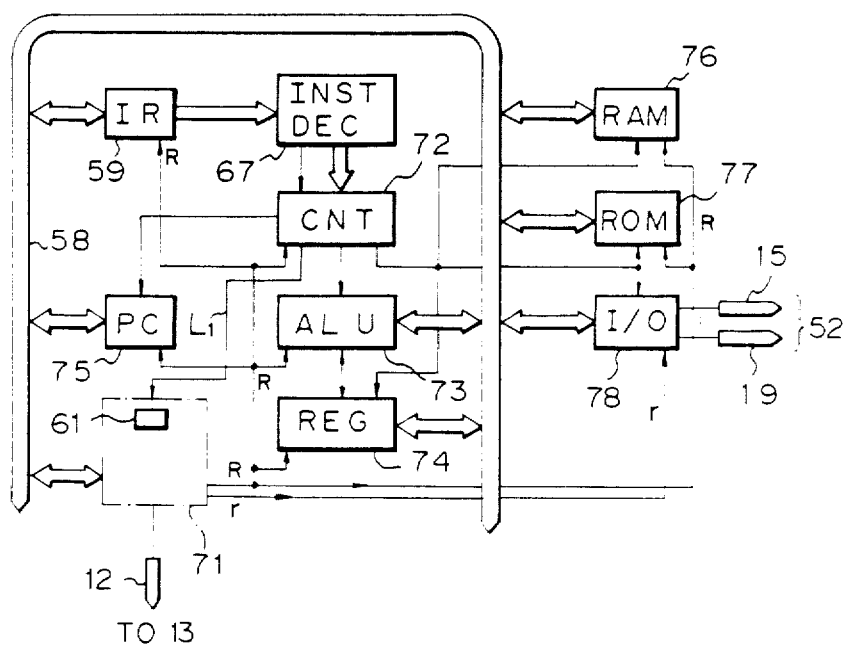
FIG. 7 is a block diagram of an example of a microcomputer unit according to an embodiment of the present invention.

FIG. 7 is a block diagram of an example of a microcomputer unit according to an embodiment of the present invention. In FIG. 7, a block 71 indicated by chain-dotted lines features the present invention. That is, the block 71 functions as a reset processing circuit. The members 12, 52, 58, 59, and 67 are the same as those shown in FIG. 5. Other members are a timing control circuit (CNT) 72, arithmetic logic unit (ALU) 73, temporary register (REG) 74, program counter (PC) 75, the RAM 76 for storing processed data momentarily, read-only memory (ROM) 77 for storing a variety of instructions, i.e., the program memory (including the power-off instruction and the internal reset instruction), and an I/O buffer 78. These members, with some modifications, are well known and commonly used in current microcomputers. The modifications according to the present invention are as follows. First, the reset processing circuit 71 is further employed in the computer, which is comprised of preexisting members, i.e., members 53, 55, and 56 of FIG. 5, and newly employed members, i.e., members 54, 61, 62, 63, 64, and 65 of FIG. 5. One of the remaining members, the flip-flop 66 is newly mounted in the I/O buffer 78. Another of the remaining members, the AND gate 60 of FIG. 5, is realized by the usual timing control circuit 72 and connected to the flip-flop 61 via a signal line $L_1$. Others of the remaining members, the computer elements 57 of FIG. 5, are specifically illustrated in FIG. 7 as the members 59, 72, 73, 74, 75, 76, and 77. All these members are reset by a signal R, which is indicative of either the external reset signal or the internal reset instruction signal and produced from the flip-flop 56 of FIG. 5 contained in the circuit 71. The output pair from the OR gate 64 and the inverter 65, both illustrated in FIG. 5, is transferred, as a signal r, to the I/O buffer 78.

Figure 8:
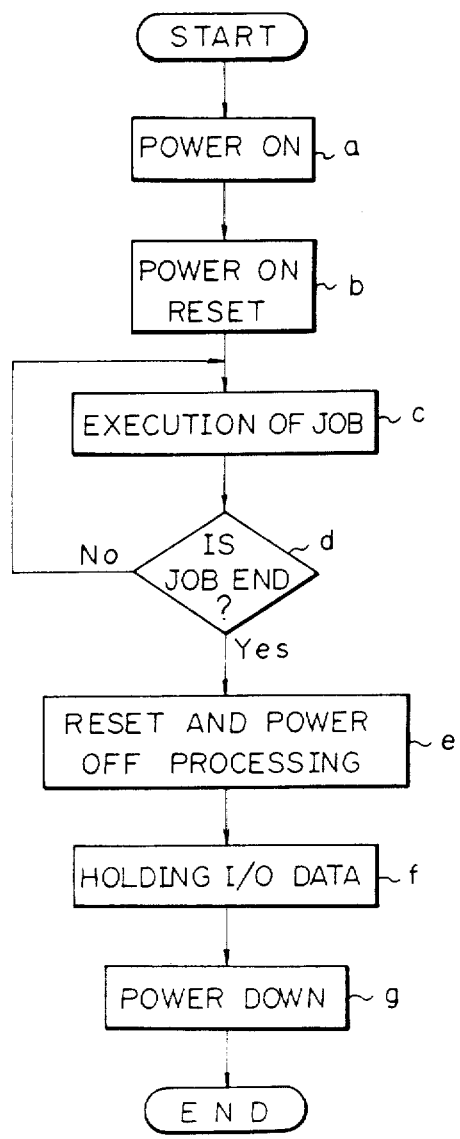
FIG. 8 is a general flow chart of processing steps performed in the computer according to the present invention.

FIG. 8 is a general flow chart of processing performed in the computer according to the present invention. In step a, the power on/off switch 14 (FIG. 1) is turned on by the start signal ST (FIG. 1), and the power source level of $V_{CC}'$ is supplied to the power supply pin 16 (FIG. 1) as the power level $V_{CC}$. In step b, a power-on reset, i.e., initialization, is performed when the reset voltage level $V_{RST}$ is "L". Then, in step c, a desired job starts being executed. The job continues until the job comes to an end. When the job comes to an end (step d), a pair of instructions, i.e., the internal reset instruction and the power-off instruction, are sequentially executed in step e. In response to the internal reset instruction, the resultant data, including the power-off signal of "L", is held by the flip-flop 66 in step f. In response to the power-off instruction, the power level $V_{CC}$ goes to zero in step g.

Regarding step e of FIG. 8, the internal reset instruction and the power-off instruction are executed sequentially. In this case, there are two possible sequences. In one, the power-off instruction is executed first and, soon after, the internal reset instruction is executed, as depicted in FIG. 6. In the other, the internal reset instruction is generated first at a timing I of FIG. 6, and then the power-off instruction is executed at the time te of FIG. 6. This sequence is not possible in a usual reset operation utilizing the prior art reset circuit 30 of FIG. 3, but is possible in the present invention. In this sequence, it should be noted that the internal reset instruction signal $I'_{RST}$ must not be produced before the generation of the power-off instruction and must be produced soon after the power-off instruction. This is because, as soon as the internal reset instruction signal $I'_{RST}$ is produced preceding the power-off instruction, the master reset operation is initiated by the flip-flop 56 of FIG. 5. If the master reset operation is performed, the power-off instruction would no longer be generated. This means that there is no chance to cut off the power by turning off the switch 14 (FIG. 1). In order to attain the related delay for the production of the signal $I_{RST}$ relative to the generation of the power-off instruction, a suitable delay element, such as multistage logic gates, must be inserted into and in series with a line for transferring the signal $I'_{RST}$, or, alternatively, in a bus for transferring the internal reset instruction data.

As mentioned above, the microcomputer unit of the present invention does not need any additional reset circuit such as the circuit 31 in FIG. 3. That is, a reset operation at the final stage activated by the additional reset circuit of the prior art is started, in the present invention, by the computer itself.

What is claimed is:

1. A microcomputer which executes instructions to produce output data, operatively connected to a first external pin for receiving an external reset signal to initialize said microcomputer and a second external pin for providing a power-on signal to hold said microcomputer in a power-on state, said microcomputer comprising:
- an instruction decoder, operatively connected to receive instructions, capable of decoding a reset instruction and outputting a control signal in response to the reset instruction; and
- internal reset signal means, operatively connected to said instruction decoder, for generating an internal reset signal in response to the control signal, said microcomputer being initialized by the internal reset signal, said internal reset signal means comprising:
  - a first flip-flop, operatively connected to said instruction decoder, for maintaining the internal reset signal as an output; and
  - a first OR gate operatively connected to said first flip-flop and the first external pin to receive the external reset signal;
- microcomputer elements operatively connected to said internal reset signal means; and
- a master reset flip-flop, operatively connected to said first OR gate and said microcomputer elements, for producing a master reset signal for initializing said microcomputer elements.

2. A microcomputer as set forth in claim 1,
wherein a power on/off switch, having an input operatively connected to the second external pin, provides a power level to said microcomputer,
wherein the second external pin further provides a power-off signal, produced in response to an instruction for a power-off operation, to the power on/off switch, and
wherein said microcomputer further comprises signal maintaining means, having an output operatively connected to the second external pin and having an input operatively connected to said master reset flip-flop, for maintaining at least the power-off signal so that the power on/off switch is held off until the power level in said microcomputer reaches zero.

3. A microcomputer as set forth in claim 2,
further comprising:
- an input/output circuit operatively connected to said signal maintaining means; and
- pins operatively connected to said input/output circuit, and
wherein said signal maintaining means includes means for maintaining the output data at said pins.

4. A microcomputer as set forth in claim 2, wherein said signal maintaining means comprises:
- an inverter operatively connected to the output of said first flip-flop;
- an AND gate, having a first input operatively connected to said inverter and a second input operatively connected to said master reset flip-flop, said AND gate being operative to pass therethrough the master reset signal from said master reset flip-flop only when the internal reset signal is not produced by said first flip-flop, and for preventing passage of the master reset signal when the internal reset signal is produced;
- a second OR gate, operatively connected to said AND gate and to receive the power-off signal, for producing an output; and
- a second flip-flop, operatively connected to said second OR gate and the second external pin, and activated by the output of said second OR gate, for maintaining an output signal representative of one of the external reset signal and the internal reset signal.

5. A microcomputer as set forth in claim 2, wherein the reset instruction is executed soon after execution of the instruction for the power-off operation.

6. A microcomputer as set forth in claim 2, wherein the reset instruction is decoded preceding the instruction for the power-off operation, but said internal reset signal means outputs the internal reset signal corresponding thereto soon after execution of the instruction for the power-off operation.

7. A microcomputer for executing instructions to produce output data, said microcomputer receiving an external reset signal at an external pin, said microcomputer comprising:
- an instruction decoder, operatively connected to receive instructions, capable of decoding the instructions including a reset instruction and outputting a control signal in response to the reset instruction;
- a set/reset circuit, operatively connected to the external pin and said instruction decoder, having an output, said set/reset circuit being set by the control signal from said instruction decoder to generate an internal reset signal and being reset by the external reset signal;
- a gate circuit, operatively connected to the external pin and said set/reset circuit, having an output for providing a master reset signal in response to one of the internal and external reset signals; and
- executing element, operatively connected to said instruction decoder and said gate circuit, for executing at least one of the instructions decoded by said instruction decoder, said executing element being initialized by the master reset signal.

* * * * *